United States Patent
Nomura et al.

(10) Patent No.: US 9,985,476 B2
(45) Date of Patent: May 29, 2018

(54) ELECTROSTATIC COUPLING TYPE CONTACTLESS ELECTRIC POWER SUPPLY DEVICE

(75) Inventors: Takeshi Nomura, Chiryu (JP); Naomichi Ishiura, Okazaki (JP); Shinji Takikawa, Nagoya (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 702 days.

(21) Appl. No.: 14/412,534

(22) PCT Filed: Jul. 2, 2012

(86) PCT No.: PCT/JP2012/066923
§ 371 (c)(1),
(2), (4) Date: May 4, 2015

(87) PCT Pub. No.: WO2014/006685
PCT Pub. Date: Jan. 9, 2014

(65) Prior Publication Data
US 2015/0236514 A1 Aug. 20, 2015

(51) Int. Cl.
*H02J 50/05* (2016.01)
*H02J 50/40* (2016.01)

(52) U.S. Cl.
CPC .............. *H02J 50/05* (2016.02); *H02J 50/40* (2016.02)

(58) Field of Classification Search
CPC ..................................................... H02J 50/05
See application file for complete search history.

(56) References Cited

U.S. PATENT DOCUMENTS 4,076,116 A * 2/1978 Sowders ............... A47F 3/0486
206/382
6,282,843 B1 * 9/2001 Shibaike ................. E04H 15/20
52/2.11
(Continued)

FOREIGN PATENT DOCUMENTS

JP  9 266643  10/1997

OTHER PUBLICATIONS

Office Action dated Apr. 1, 2017 in Chinese Patent Application No. 201280074456.1 (submitting English language translation only).
(Continued)

*Primary Examiner* — Rexford Barnie
*Assistant Examiner* — David Shiao
(74) *Attorney, Agent, or Firm* — Oblon, McClelland, Maier & Neustadt, L.L.P.

(57) ABSTRACT

The present invention of an electrostatic coupling type contactless electric power supply device 1 has multiple electrodes for contactless electric power supply 41 and a high-frequency power source circuit 5 provided on a fixed section 2, multiple electrodes for contactless electric power reception 61 and an electric power reception circuit 7 on a movable section 3, wherein the electrode for contactless electric power supply 41 and the electrode for contactless electric power reception 61 have base sections 441, 611 with a perpendicular cross sectional shape to the moving direction of the movable section 3 and there are multiple extending tooth sections 412, 612, and fellow tooth sections 412, 612 are mutually alternating and separated to fit together in an interdigitated array electrode, furthermore, the electrode for contactless electric power reception 61 is an interdigitated array electrode with the outer surface of the tooth section 612 covered with a conducting layer 613 and the tooth section 612 internal section and the base section 613

(Continued)

are formed from material that has a smaller specific gravity than the conducting layer. And from this, the electric power supply capacity and electric power supply efficiency of the contactless electric power supply is improved from that conventionally, and the movable section 3 which is the power supply target can be lighter.

6 Claims, 5 Drawing Sheets

(56) References Cited

U.S. PATENT DOCUMENTS

| | | | | |
|---|---|---|---|---|
| 6,526,925 | B1* | 3/2003 | Green, Jr. | F01B 13/045 |
| | | | | 123/43 R |
| 2003/0184121 | A1* | 10/2003 | Czaplicki | B29C 44/18 |
| | | | | 296/187.02 |
| 2007/0252679 | A1* | 11/2007 | Fagrenius | B06B 1/16 |
| | | | | 340/407.1 |
| 2011/0090030 | A1* | 4/2011 | Pagani | H04B 5/0012 |
| | | | | 333/24 R |
| 2011/0101792 | A1* | 5/2011 | Koumoto | B60L 5/005 |
| | | | | 307/104 |
| 2011/0316353 | A1* | 12/2011 | Ichikawa | H02J 7/0044 |
| | | | | 307/149 |
| 2012/0025628 | A1* | 2/2012 | Ichikawa | H02J 7/0044 |
| | | | | 307/104 |
| 2012/0091818 | A1* | 4/2012 | Wesemann | H02J 5/005 |
| | | | | 307/104 |

OTHER PUBLICATIONS

International Search Report dated Jul. 24, 2012 in PCT/JP12/066923 Filed Jul. 2, 2012.

Combined Chinese Office Action and Search Report dated Jul. 6, 2016 in Patent Application No. 201280074456.1 (with partial English translation and English translation of categories.

Extended European Search Report dated Jan. 27, 2016 in Patent application No. 12880381.4.

* cited by examiner

ELECTROSTATIC COUPLING TYPE CONTACTLESS ELECTRIC POWER SUPPLY DEVICE

TECHNICAL FIELD

The present invention relates to a contactless electric power supply device that supplies power to a current consumer on a movable section from a fixed section in a contactless manner, in particular, it relates to an electrostatic coupling type contactless electric power supply device arranged with facing and separated electrode plates.

BACKGROUND ART

For board manufacturing equipment for producing boards mounted with multiple components, there are solder printing machines, component mounters, reflow machines, board inspection machines and so on, and there are many cases in which these are configured into board producing lines by linking them with a board conveyance device. Many of these board manufacturing equipment are equipped with a movable section which performs work after moving to a specified position above the board, and a linear motor device can be used as a means for moving the movable section. A linear motor device is typically comprised of a track member with multiple magnets with alternating N poles and S poles arranged along the moving direction, and a movable section which includes an armature with a core and coil. In order to supply electricity to a current consumer on the movable section such as a linear motor device, a deformable cable for supplying electricity has been used. Also, in recent years, in order to reduce negative effects such as risks of disconnections from metal fatigue and the load weight capacity increasing due to power supply cables, contactless electric power supply devices have been proposed.

For the contactless electric power supply device method, an electromagnetic induction method using a coil has been used a lot, but recently electrostatic coupling methods using a capacitor configuration with opposing electrode plates have become used, and there are other methods such as magnetic field resonance and so on being evaluated. Contactless electric power supply devices are not limited to use just for board manufacturing equipment, they are suitable for a wide range of fields such as other industry industrial equipment, home electronics, and so on. A technological example of a contactless electric power supply device equipped in an automobile is disclosed in patent literature 1.

The signal power transmitting equipment of patent literature 1 has a pair of opposing electromagnetic coupling devices or electrostatic coupling devices attached in the door panel and body panel respectively, and, charging equipment and a battery are equipped in the door side. And, the configuration is such that electric power can be stored in the battery from the contactless power supply and supplied to electric devices in the door side. It is disclosed that, due to this, a wire harness between the automotive body and door is not necessary, making wiring work easier, and it is possible to reduce costs and save resources. Furthermore, in embodiment 2, disclosed are multiple electrodes inserted in alternately different states acting as the configuration for a pair of electrostatic coupling devices, with capacitors with a large electrostatic capacity being configured such that the opposing surface areas of the electrodes are increased.

CITATION LIST

Patent Literature

Patent Literature 1: Japanese Unexamined Patent Application Publication Number Heisei 9-266643

SUMMARY OF INVENTION

Problem to be Solved by the Invention

Incidentally, when equipping a contactless electric power supply device in board manufacturing equipment, due to the movable section weight becoming larger from the heavier weight of the coil and the restrictions which arise in the configuration to avoid magnetic interference with the linear motor device with the electromagnetic induction method, the electrostatic coupling method is considered promising. The electric power supply capacity and electric power supply efficiency for the electrostatic coupling method of contactless power supply is dependent on the size of the electrostatic capacity of the capacitor configured from the electrodes of the fixed section and movable section. However, if the electrodes are made large in order to increase the electrostatic capacity, also the weight of the movable section tends to be increased. In addition, from the total surface area of the electrodes there are limits on the ratio of the effective areas that can oppose each other and contribute to contactless electric power supply, and the electric power supply efficiency rate is decreased by the amount of the electric field which is needlessly emitted from the sections that are not opposing each other. This means that the electrostatic coupling device situation for embodiment 2 of patent literature 1 is desirable, but there still remains scope to improve efficiency more. The problem of improving efficiency is not just limited to board manufacturing equipment, and is shared for contactless electric power supply devices used in a wide range of fields.

The present invention has been made in consideration of the problems in the background art, and an object thereof is to provide a lightweight electrostatic coupling type contactless electric power supply device for a movable section that is the power supply target, which also improves compared to previously the electric power supply capacity and electric power supply efficiency of the contactless electric power supply.

Means for Solving the Problem

The present invention of an electrostatic coupling type contactless electric power supply device from claim 1 which solves the above problems comprises: multiple electrodes for contactless electric power supply provided on a fixed section, a high-frequency power source circuit which supplies high-frequency electric power between the multiple electrodes for contactless electric power supply, multiple electrodes for contactless electric power reception for receiving high-frequency electric power in a contactless manner which are respectively facing and separated from the multiple electrodes for contactless electric power supply and which are provided on a movable section movably mounted on the fixed section, and an electric power reception circuit which supplies electric power to the current consumer on the movable section after converting the high-frequency power which the multiple electrodes for contactless electric power reception received; wherein the electrode for contactless electric power supply and the electrode for contactless electric power reception have a cross section shape perpendicular to the moving direction of the movable section made from a base section and multiple tooth sections extending from the base section, and are interdigitated array electrodes in which the multiple fellow tooth sections are mutually alternating and separated while fitting together; furthermore, the electrode for contactless electric power reception is an interdigitated array electrode in which the outer surface of the tooth section is covered with a conducting layer and the tooth section internal section and the base section are formed from material that has a smaller specific gravity than the conducting layer.

For the present invention from claim 2, the electrostatic coupling type contactless electric power supply device comprises: multiple electrodes for contactless electric power supply provided on a fixed section, a high-frequency power source circuit which supplies high-frequency electric power between the multiple electrodes for contactless electric power supply, multiple electrodes for contactless electric power reception for receiving high-frequency electric power in a contactless manner which are respectively facing and separated from the multiple electrodes for contactless electric power supply and which are provided on a movable section movably mounted on the fixed section, an electric power reception circuit which supplies electric power to the current consumer on the movable section after converting the high-frequency power which the multiple electrodes for contactless electric power reception received; wherein the electrode for contactless electric power supply and the electrode for contactless electric power reception have a cross section shape perpendicular to the moving direction of the movable section made from a base section and multiple tooth sections extending from the base section, and are interdigitated array electrodes in which the multiple fellow tooth sections are mutually alternating and separated while fitting together; furthermore, the electrode for contactless electric power reception is an interdigitated array electrode made lighter by at least one of the tooth section and the base section having a space inside.

Further, for the invention from claim 2, it is possible to consider a situation in which the material with the smaller specific gravity which forms the internal section of the tooth section and base section and which gives mechanical strength to the conducting layer of the electrode for contactless electric power reception in claim 1 is omitted.

For the invention from claim 3, with respect to claim 1 or claim 2, the electrode for contactless electric power supply is an interdigitated array electrode in which in the outer surface of the tooth section is covered with a conducting layer and the tooth section internal section and the base section are formed from material that has a smaller specific gravity than the conducting layer; or the electrode for contactless electric power supply is an interdigitated array electrode made lighter by at least one of the tooth section and the base section having a space inside.

For the invention from claim 4, with respect to any of the claims from 1 to 3, the cross sectional shape of the tooth section of the interdigitated array electrode is wider near the base section side and gets narrower the further away from the base section to form a triangular cross section or trapezoidal cross section.

For the invention from claim 5, with respect to any of the claims from 1 to 4, the movable section is equipped in board manufacturing equipment for performing prescribed work on a board.

Effects of the Invention

With the contactless electric power supply device from claim 1, the electrode for contactless electric power supply and electrode for contactless electric power reception are interdigitated array electrodes in which the multiple fellow tooth sections are mutually alternating and separated while fitting together; furthermore, for the electrode for contactless electric power reception, the outer surface of the tooth section is covered with a conducting layer and the tooth section internal section and the base section are formed from material that has a smaller specific gravity than the conducting layer. It follows that, a capacitor with large volume electrostatic capacity is formed from the two interdigitated array electrodes and the electric power supply capacity of the contactless electric power supply can be increased compared to conventional technology which uses flat electrodes. Furthermore, by using an interdigitated array electrode, from the surface area of the electrodes the ratio of the effective areas that can oppose each other and contribute to contactless electric power supply can be increased, and the electric power supply efficiency for the contactless electric power supply can be improved by reducing needlessly emitted electric fields. In addition, because a major section of the electrode for contactless electric power reception on the movable section is formed with material that has a smaller specific gravity, the movable section which is the power supply target can be lighter.

For the invention from claim 2, in the same manner as claim 1, the electric power supply capacity and electric power supply efficiency of the contactless electric power supply can be improved. In addition, because the electrode for contactless electric power reception on the movable section side is made lighter by having a space inside, the movable section which is the power supply target can be lighter.

For the invention from claim 3, because the electrode for contactless electric power supply on the fixed section is formed largely from material that has a smaller specific gravity, or is made lighter by having a space inside, the fixed section can be made lighter.

For the invention from claim 4, because the cross sectional shape of the tooth section of the interdigitated array electrode has a triangular cross section or trapezoidal cross section, manufacturing such as by casting and forging is simpler and manufacturing costs can be reduced.

For the invention from claim 5, the movable section is equipped in board manufacturing equipment for performing prescribed work on a board. The electrostatic coupling type contactless electric power supply device according to the invention may be equipped in board manufacturing equipment, and the movable section for performing prescribed work can be lighter. From this, the contactless electric power supply device cost becomes cheaper from being small and lightweight and this can contribute to a reduction in the equipment cost for board manufacturing equipment.

DESCRIPTION OF EMBODIMENTS

Figure 1:
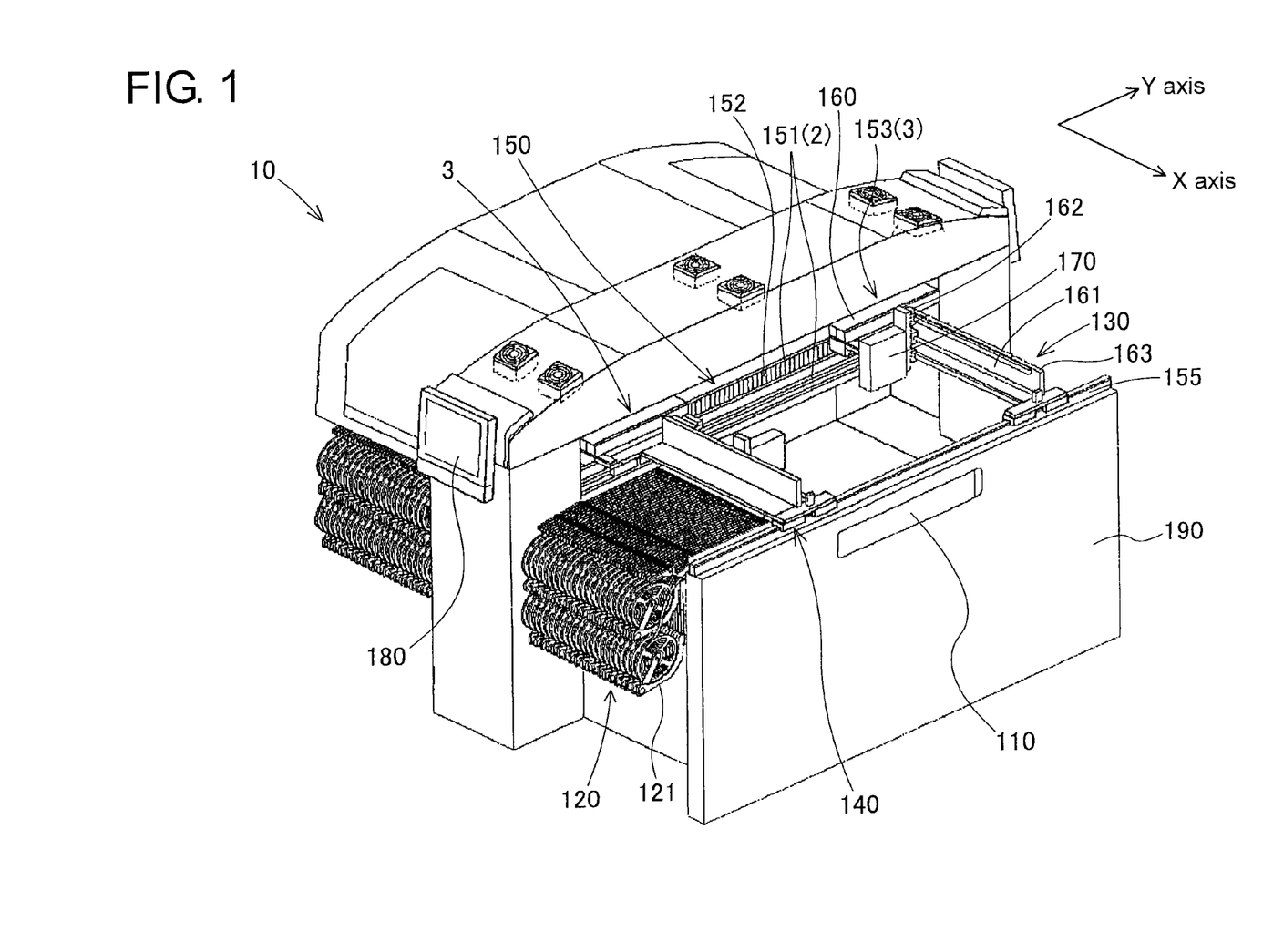
FIG. 1 This is a perspective view showing the overall configuration of a component mounter which can use the electrostatic coupling type contactless electric power supply device of embodiment 1 of the present invention.

First, component mounter 10 which can use the present invention is described with reference to FIG. 1. FIG. 1 is a perspective view showing the overall configuration of component mounter 10 which can use the electrostatic coupling type contactless electric power supply device 1 of embodiment 1 of the present invention. Component mounter 10 is a device for mounting many components onto a board, and has a configuration in which two sets of component mounting units with the same construction are arranged largely with bilateral symmetry. Here, a component mounting unit with the cover removed at the front right side of FIG. 1 is described as an example. In the figure, the width of component mounter 10 going from the left rear side to the front right side is the X-axis direction, and the length of component mounter 10 is the Y-axis direction.

Component mounter 10 is configured with board conveyance device 110, component supply device 120, two component transfer devices 130 and 140, and so on assembled to base 190. Board conveyance device 110 is transversely in the X-axis direction around the center of the lengthwise direction of component mounter 10. Board conveyance device 110 uses a conveyor which is omitted from the figure and conveys boards in the X-axis direction. Also, board conveyance device 110 uses a clamp device which is omitted from the figure and secures and holds boards at a predetermined mounting work position. Component supply device 120 is provided at the front section (the left front side of FIG. 1) and at the rear section (cannot be seen in the FIG) in the lengthwise direction of component mounter 10. Component supply device 120 uses multiple cassette type feeders 121, and components are consecutively supplied to the two component transfer devices 130 and 140 from carrier tape set in each feeder 121.

The two component transfer devices 130 and 140 are what are known as XY-robot type devices, which can move in the X-axis direction and Y-axis direction. The two component transfer devices 130 and 140 are arranged facing each other at the front side and rear side of component mounter 10 in the lengthwise direction. To move each component transfer device 130 and 140 in the Y-axis direction, there is a linear motor device 150.

Linear motor device 150 comprises support rail 155 and track member 151 shared for the two component transfer devices 130 and 140 and linear movable section 153 for each of the two component transfer devices 130 and 140. Track member 151 corresponds to part of fixed section 2 of this invention, is arranged parallel on both sides sandwiching linear movable section 153, and extends in the Y-axis direction which is the moving direction for linear movable section 153. On the internal facing surfaces of track member 151, multiple magnets 152 are arranged in a row in the Y-axis direction. Linear movable section 153 is movably mounted on track member 151.

Linear movable section 153 which corresponds to movable section 3 of the invention, is comprised of movable main body section 160, X-axis rail 161, mounting head 170, and the like. Movable main body section 160 extends in the Y-axis direction, and an armature that generates driving force facing magnets 152 for track member 151 is arranged on both side surfaces. X-axis rail 161 extends in the X-axis direction from the movable main body section 160. End 162 of the X-axis rail 161 is connected to movable main body section 160, and the other end 163 is movably mounted on support rail 155, such that it moves integrally with movable main body section 160 in the Y-axis direction.

Component mounting head 170 is mounted on X-axis rail 161 such that it moves in the X-axis direction. Suction nozzles which are omitted from the figure are provided on the lower side of component mounting head 170. Suction nozzles use negative pressure to pick up components from component supply device 120 and mount them on the printed circuit board at the mounting work position. The ball screw mechanism which is omitted from the figure mounted on X-axis rail 161 has an X-axis motor that provides the ball screw rotational movement, and drives component mounting head 170 in the X-axis direction. The multiple electrical devices equipped on movable section 3 in order to move component mounting head 170 correspond to current consumers L of this invention. Further, the armature for linear motor device 150 is also included as a current consumer L.

Component mounter 10 is also provided with display settings device 180 for exchanging information with operators, cameras for capturing images of boards and components which are omitted from the figure, and so on.

Figure 2:
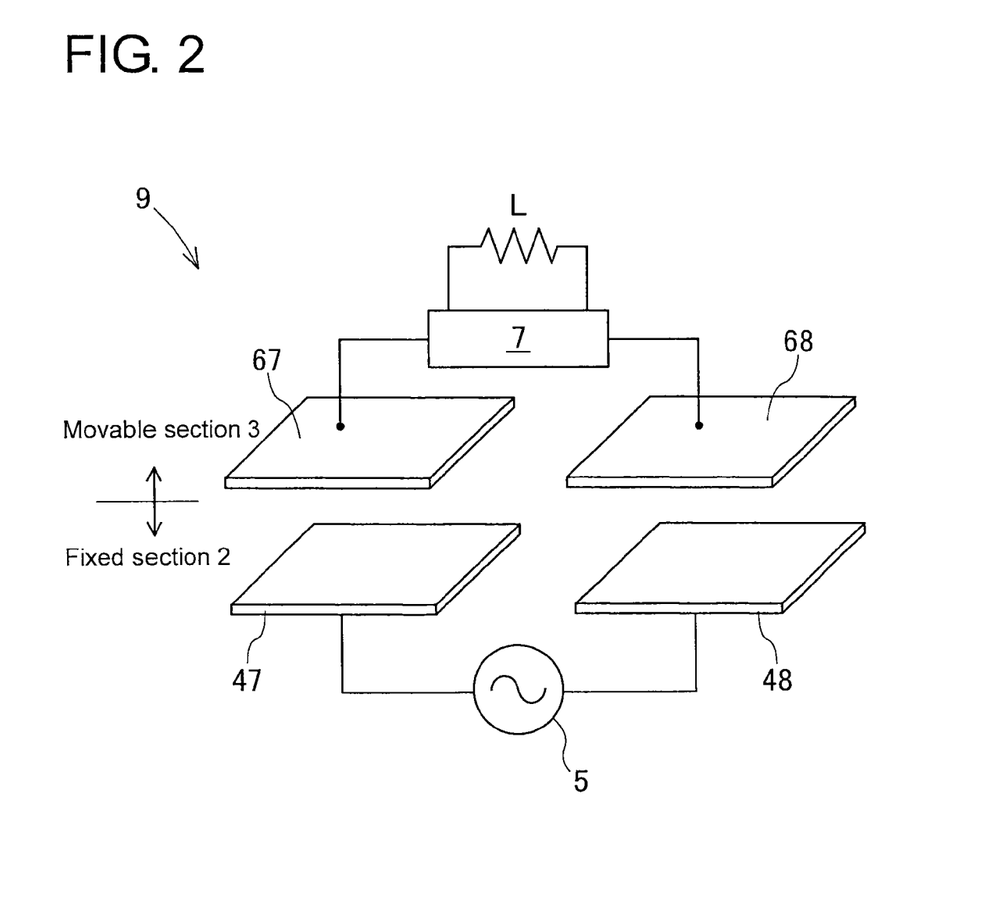
FIG. 2 This is a diagram to illustrate conceptually a conventional electrostatic coupling type contactless electric power supply device.

Next, conventional electrostatic coupling type contactless electric power supply device 9 is described with reference to FIG. 2. FIG. 2 is a diagram to illustrate conceptually a conventional electrostatic coupling type contactless electric power supply device 9. The fixed section 2 in the lower part of FIG. 2 is equipped with two flat electrodes for electric power supply 47, 48 and a high-frequency power source circuit 5. Two flat electrodes for electric power supply 47, 48 are formed using metals plates and so on and are electrically connected to high-frequency power source circuit 5. High-frequency power source circuit 5 supplies for example 100 kHz to MHz high-frequency electric power to the two flat electrodes for electric power supply 47, 48. The output voltage of high-frequency power source circuit 5 can be adjusted and the output voltage waveform may be exemplified by a sinusoidal wave, a rectangular wave, and the like.

Also, on movable section 3 in the upper part of FIG. 2, two flat electrodes for receiving electric power 67, 68 and electric power reception circuit 7 are equipped and current consumer L is loaded. Two flat electrodes for receiving electric power 67, 68 are formed using metals plates and so on and are facing and separated from the flat electrodes for electric power supply 47, 48 on the fixed section 2 side. From this, two capacitors are configured between the flat electrodes for electric power supply 47, 48 and flat electrodes for receiving electric power 67, 68; and electrostatic coupling type contactless electric power supply is performed. The two flat electrodes for receiving electric power 67, 68 are electrically connected to the input side of electric power reception circuit 7 and the output side of electric power reception circuit 7 is electrically connected to current consumer L. Electric power reception circuit 7 converts the high-frequency electric power received by flat electrodes for receiving electric power 67, 68 and supplies electric power to current consumer L. Electric power reception circuit 7 is comprised with a circuit matching the electric power specification of current consumer L, for example, it may use a full-wave rectifier circuit and an inverter circuit and so on.

And usually, in order to improve the electric power supply capacity and electric power supply efficiency, a series resonant circuit is used. In other words, to generate the series resonance by the output frequency of the high-frequency power source circuit 5, appropriate coils are inserted and connected in high-frequency power source circuit 5 or electric power reception circuit 7, and it is possible to variably adjust the output frequency itself.

When it is desired to make the electric power supply capacity of conventional electrostatic coupling type contactless electric power supply device 9 large, it is necessary to expand the opposing surface area of flat electrodes for electric power supply 47, 48 and flat electrodes for receiving electric power 67, 68 to enlarge to electrostatic capacity of the capacitor. However, making the flat electrodes for receiving electric power 67, 68 into a large shape is directly connected to making the movable section 3 larger and heavier which is undesirable. For this point, in the present invention, interdigitated array electrodes are used as a substitute for flat electrodes.

Figure 3:
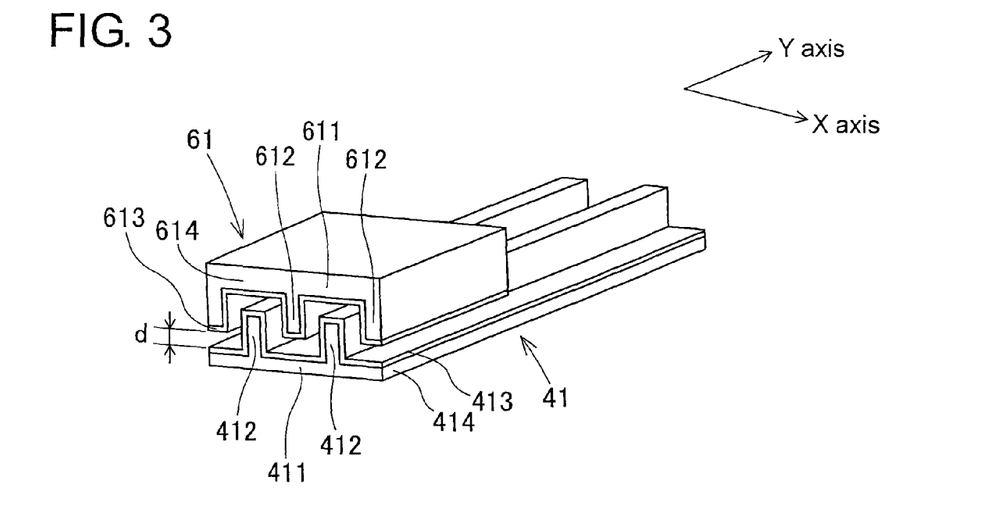
FIG. 3 This is a perspective view of the interdigitated array electrodes used in the electrostatic coupling type contactless electric power supply device of embodiment 1 of the present invention.

FIG. 3 is a perspective view of the interdigitated array electrodes used in the electrostatic coupling type contactless electric power supply device 1 of embodiment 1 of the present invention. The interdigitated array electrode in the lower section of the figure is the electrode for contactless electric power supply 41 provided on fixed section 2, and the interdigitated array electrode in the upper section of the figure is the electrode for contactless electric power reception 61 provided on movable section 3. Electrode for contactless electric power supply 41 is positioned between parallel track members 151 of component mounter 10 and below movable section 3, and extends in the Y-axis direction. Electrode for contactless electric power supply 41, as shown in the figure, has a cross section shape in the X-axis direction perpendicular to the moving direction of movable section 3 which is an interdigitated shape. More specifically, two rectangular cross section tooth sections 412 separated from each other are established facing vertically upwards from the upper surface of base section 411 which extends horizontally in the X-axis direction. The outside surface of tooth section 412 is covered by conducting layer 413. Conducting layer 413 also covers the upper surface of base section 411, and is connected as one continuous piece on the upper side of the electrode for contactless electric power supply 41. The internal section of tooth section 412 and lower surface of base section 411 are integrated as a core body 414 and are formed from material that has a smaller specific gravity than conducting layer 413.

On the other hand, electrode for contactless electric power reception 61 is arranged facing downwards on the bottom surface of movable section 3. Electrode for contactless electric power reception 61 also has an interdigitated array shape for the cross section shape in the X-axis direction. More specifically, three rectangular cross section tooth sections 612 separated from each other are established facing vertically downwards from the lower surface of base section 611 which extends horizontally in the X-axis direction. The outside surface of tooth section 612 is covered by conducting layer 613. Conducting layer 613 also covers the lower surface of base section 611, and is connected as one continuous piece on the lower side of the electrode for contactless electric power reception 61. The internal section of tooth section 612 and upper surface of base section 611 are integrated as a core body 614 and are formed from material that has a smaller specific gravity than conducting layer 613. The length of electrode for contactless electric power reception 61 in the Y-axis direction is smaller than that of electrode for contactless electric power supply 41. Electrode for contactless electric power reception 61 moves above and within the range of the electrode for contactless electric power supply 41 with the movement of movable section 3 in the Y-axis direction.

At this time, for the electrode for contactless electric power supply 41 and electrode for contactless electric power reception 61, the fellow tooth sections 412, 612 maintain a fit together condition with each other whereby they are mutually alternating and separated by generally fixed clearance d. In addition, in order to make FIG. 3 easier to understand, an example is given with two tooth sections 412 and three tooth sections 612, but, in fact, it is possible to provide more tooth sections which are fitted together and separated. From this, the capacitor formed from electrode for contactless electric power supply 41 and electrode for contactless electric power reception 61 has much more expanse of opposing surface area compared to a capacitor formed from flat electrodes 47, 48, 67, 68 and the electrostatic capacity is much larger.

Conducting layers 413, 613 of electrode for contactless electric power supply 41 and electrode for contactless electric power reception 61 can be formed from a metal material that has high conductivity, for example a thin film or laminate of silver or copper and the like. Core bodies 414, 614 of electrode for contactless electric power supply 41 and electrode for contactless electric power reception 61 can be formed from material with a smaller specific gravity than conducting layers 413, 613, for example aluminum or synthetic resin, and conductivity is not a requirement. For binding the core bodies 414, 614 and conducting layers 413, 613, it is possible to use methods such as metal plating, metal deposition, and gluing.

Figure 4:
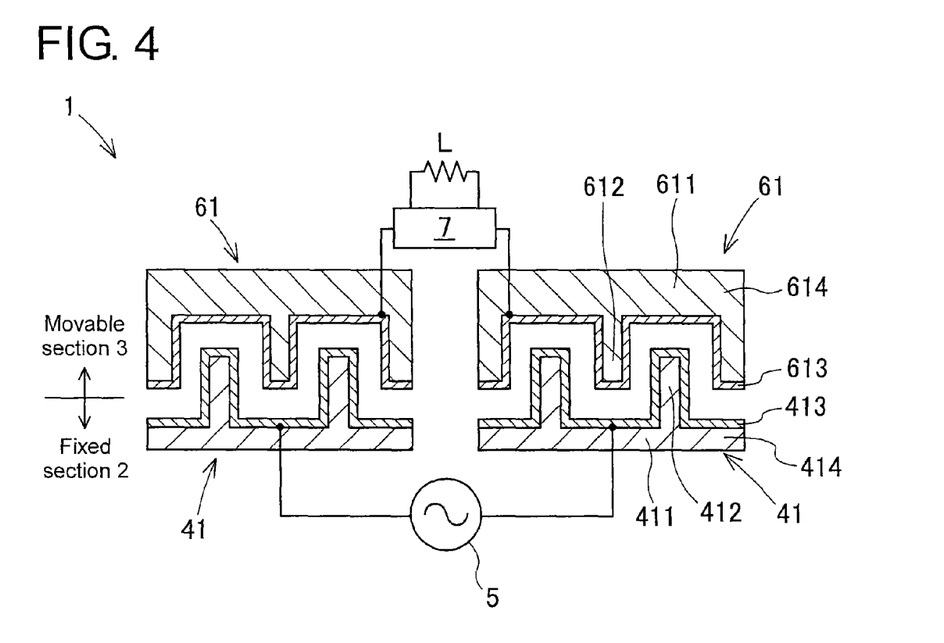
FIG. 4 This is a configuration diagram showing the entire body configuration of the electrostatic coupling type contactless electric power supply device of embodiment 1 of the present invention including the cross section structure of the interdigitated array electrodes.

The electrostatic coupling type contactless electric power supply device 1 of embodiment 1 is equipped with two sets of the configurations shown in FIG. 3. FIG. 4 is a configuration diagram showing the entire body configuration of the electrostatic coupling type contactless electric power supply device 1 including the cross section structure of the interdigitated array electrodes. In FIG. 4, the front/back direction of the page is the Y-axis moving direction for movable section 3. As shown in the figure, the conducting layer 413 of the two electrodes for contactless electric power supply 41 is electrically connected to high-frequency power source circuit 5 on the fixed section 2 side. In addition, the conducting layer 613 of the two electrodes for contactless electric power reception 61 are electrically connected to the input side of electric power reception circuit 7 and the output side of electric power reception circuit 7 is electrically connected to current consumer L on the movable section 3 side. High-frequency power source circuit 5 and electric power reception circuit 7 are appropriately designed to match the large electrostatic capacity of the capacitor formed from electrode for contactless electric power supply 41 and electrode for contactless electric power reception 61.

With the electrostatic coupling type contactless electric power supply device 1 of embodiment 1, a large volume electrostatic capacity capacitor is configured from electrode for contactless electric power supply 41 and electrode for contactless electric power reception 61 which are interdigitated array electrodes. It follows that, the electric power supply capacity of the contactless electric power supply can be increased when compared to conventional technology employing flat electrodes 47, 48, 67, 68. Furthermore, by using an interdigitated array electrode for electrode for contactless electric power supply 41 and electrode for contactless electric power reception 61, from the surface area of the electrodes the ratio of the effective areas that can oppose each other and contribute to contactless electric power supply can be increased. It follows that, the needless emission of an electric field from electrode for contactless electric power supply 41 is reduced and the electric power supply efficiency for the contactless electric power supply can be improved.

Figure 5:
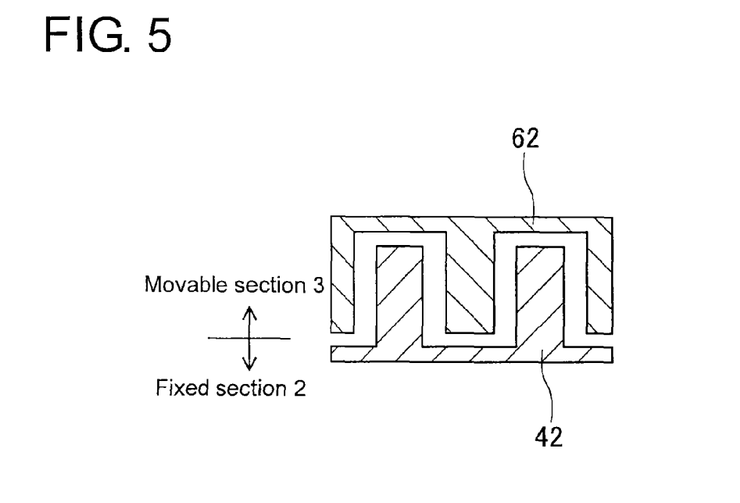
FIG. 5 For a reference form of an electrostatic coupling type contactless electric power supply device which is a simplification of embodiment 1, this is a cross section of the interdigitated array electrode used as the electrode for contactless electric power supply and electrode for contactless electric power reception.

In addition, FIG. 5, for a reference form of an electrostatic coupling type contactless electric power supply device which is a simplification of embodiment 1, is a cross section of the interdigitated array electrode used as the electrode for contactless electric power supply 42 and electrode for contactless electric power reception 62. As for the reference form, the outer shape of electrode for contactless electric power supply 42 and electrode for contactless electric power reception 62 is the same as 41 and 61 from embodiment 1 and is formed from a single metal material such as copper. The configuration for other sections of the reference form is the same as embodiment 1. It follows that, the electrostatic capacity of the capacitor formed by electrode for contactless electric power supply 42 and electrode for contactless electric power reception 62 is the same as in embodiment 1 and the same level of electric power supply capacity and electric power supply efficiency is obtained.

However, because the electrode for contactless electric power reception 62 becomes undesirably heavier for the reference form, the total weight of movable section 3 is increased. As an adverse effect from the above, it is necessary to increase the power of the armature of linear motor device 153 or increase the electric power supply capacity of the contactless electric power supply and so on. In comparison, for embodiment 1, because a majority of the electrode for contactless electric power reception 61 on the movable section 3 is formed with material that has a smaller specific gravity, the movable section 3 which is the power supply target can be lighter. In addition, the movable section 3 for embodiment 1 can be made remarkably smaller and lighter when compared to maintaining the same approximate electrostatic capacity using conventional technology employing flat electrodes 47, 48, 67, 68.

Furthermore, for embodiment 1, because a majority of the electrode for contactless electric power supply 41 for fixed section 2 is formed from material with a smaller specific gravity, fixed section 2 can also be made lighter.

The electrostatic coupling type contactless electric power supply device 1 of embodiment 1, when equipped on a component mounter 10, can make the linear movable section 153 including component mounting head 170 lighter. And from this, the required electric power for the driving force of linear movable section 153 is reduced and the electric power supply capacity of the contactless electric power can also be reduced and contactless electric power supply device 1 costs become cheaper from being smaller and lightweight. Due to the overall effect, this contributes to the possibility of reducing the equipment cost of component mounter 10.

Figure 6:
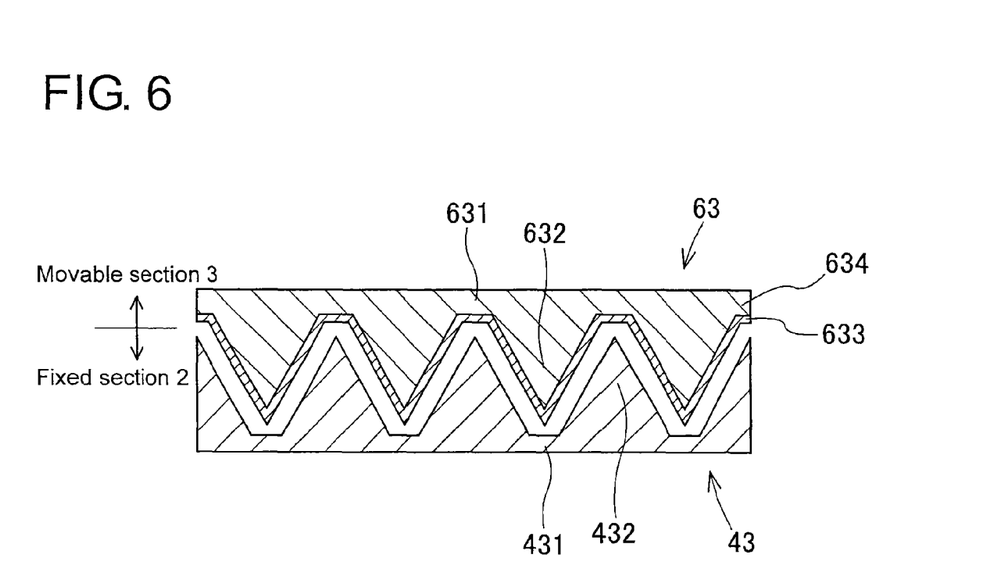
FIG. 6 This is a cross section view of the interdigitated array electrodes used in the electrostatic coupling type contactless electric power supply device of embodiment 2 of the present invention.

Next, mainly described are the differences of the electrode shape for the electrostatic coupling type contactless electric power supply device of embodiment 2. FIG. 6 is a cross section view of the interdigitated array electrodes used in the electrostatic coupling type contactless electric power supply device of embodiment 2 of the present invention. The interdigitated array electrode in the lower section of the figure is the electrode for contactless electric power supply 43 provided on fixed section 2, and the interdigitated array electrode in the upper section of the figure is the electrode for contactless electric power reception 63 provided on movable section 3.

As shown in the figure, for the electrode for contactless electric power supply 43 of embodiment 2, the cross section shape of the multiple tooth sections 432 is different from embodiment 1, being wider at the side near the base section 431, and getting narrower the further away from base section 431 to form a triangular cross section. Base section 431 and tooth section 432 are formed in a single body using a single metal material such as copper.

On the other hand, for the electrode for contactless electric power reception 63 of embodiment 2 also, the cross section shape of the multiple tooth sections 632 is wider near the base section 631, and gets narrower the further away from base section 631 to form a triangular cross section. The outside surface of tooth section 632 is covered by conducting layer 633. Further, conducting layer 633 also covers the lower surface of base section 631, and is connected as one continuous piece on the lower side of the electrode for contactless electric power supply 63. The internal section of tooth section 632 and upper surface of base section 631 are integrated as a core body 634 and is formed from material that has a smaller specific gravity than conducting layer 633.

For the electrode for contactless electric power supply 43 and electrode for contactless electric power reception 63, the fellow inclined surfaces of multiple tooth sections 432, 632 fit together with each other whereby they are mutually alternating and separated by a generally fixed clearance. It follows that, the same approximate electrostatic capacity as that for embodiment 1 is maintained also for embodiment 2. In addition, the configuration for other sections of embodiment 2 is the same as embodiment 1.

For the electrostatic coupling type contactless electric power supply device of embodiment 2, the electric power supply capacity and electric power supply efficiency of the contactless electric power supply can be improved the same as for embodiment 1, and the movable section can be made lighter. Furthermore, due to the triangular cross section shape of tooth sections 432, 632, casting and forging the electrode for contactless electric power supply 43 and electrode for contactless electric power reception 63 is comparatively easier than that for the rectangular cross section shape for embodiment 1, and manufacturing costs can be reduced. In addition, forming the electrode for contactless electric power supply 43 from a single metal material results in reduced manufacturing cost as a substitute for being lighter.

Figure 7:
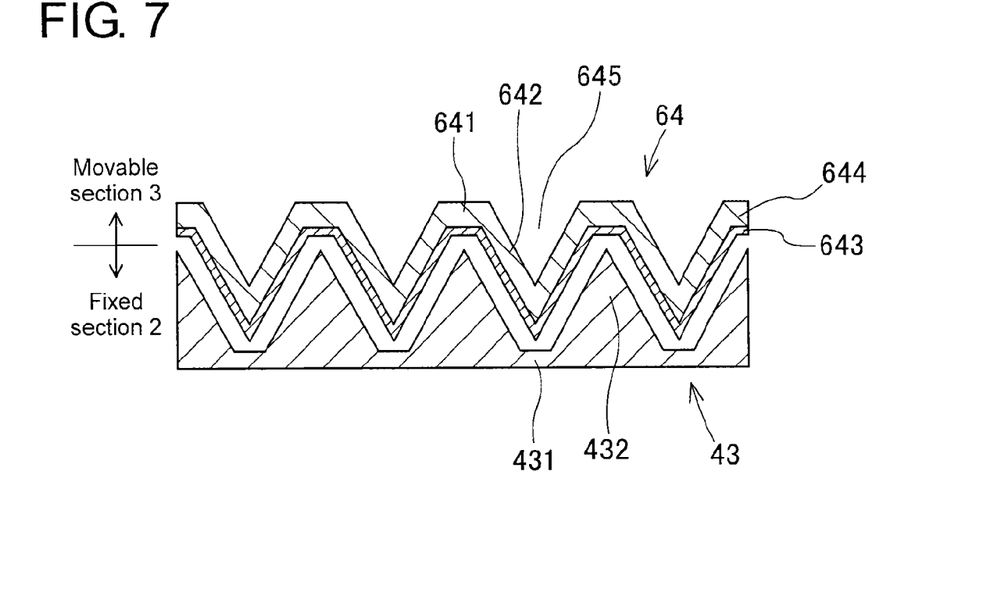
FIG. 7 This is a cross section view of the interdigitated array electrodes used in embodiment 2 of the present invention.

Furthermore, FIG. 7 shows an application example of embodiment 2 in which movable section 3 can be made even lighter. FIG. 7 is a cross section view of the interdigitated array electrodes used in embodiment 2 of the present invention. As shown in the figure, in the application example, the conducting layer 643 of electrode for contactless electric power reception 64 has the same shape as in embodiment 2, and the difference is that triangular cross section space 645 is provided in the tooth section 642 from base section 641 of core body 644. This application example for electrode for contactless electric power reception 64 is even lighter than electrode for contactless electric power reception 63 of embodiment 2 by the amount of space 645.

Figure 8:
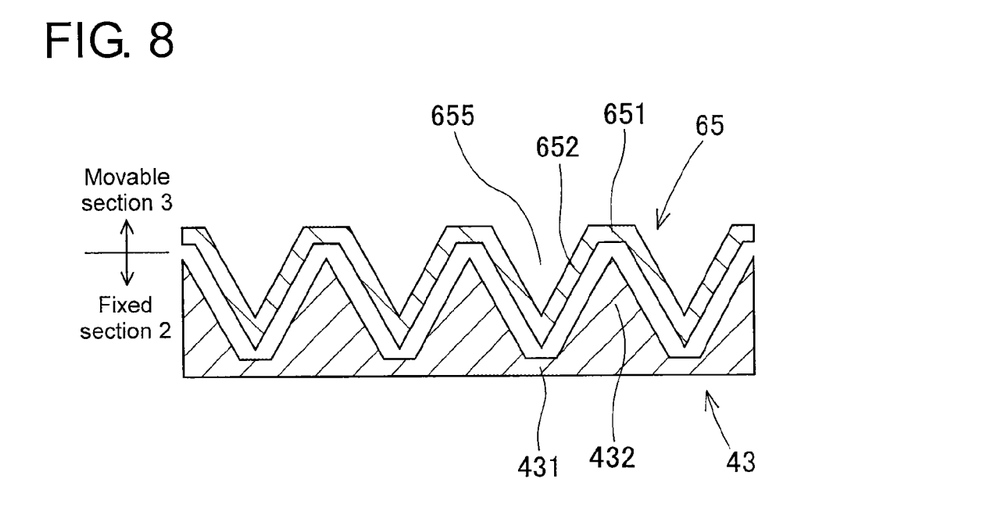
FIG. 8 This is a cross section view of the interdigitated array electrode used in the electrostatic coupling type contactless electric power supply device of embodiment 3 of the present invention.

Next, mainly described are the differences of the electrode shape for the electrostatic coupling type contactless electric power supply device of embodiment 3. FIG. 8 is a cross section view of the interdigitated array electrode used in the electrostatic coupling type contactless electric power supply device of embodiment 3 of the present invention. The interdigitated array electrode in the lower section of the figure is the electrode for contactless electric power supply 43 which is the same as embodiment 2, and the interdigitated array electrode in the upper section of the figure is the electrode for contactless electric power reception 65 equipped on movable section 3.

As shown in the figure, electrode for contactless electric power reception 65 for embodiment 3 is formed from a bent metal plate of alternating base section 651 and tooth section 652. The cross section shape of tooth section 652, has space 655 which is wide near base section 651, and space 655 gets narrower the further away from base section 651 to form a triangular cross section. Electrode for contactless electric power reception 65 does not have a core body and mechanical strength is maintained from the metal plate itself, and bending and deforming is restrained.

Embodiment 3 maintains the same electrostatic capacity as embodiment 2, and the electric power supply capacity and electric power supply efficiency of the contactless electric power supply can be improved approximately the same level as embodiment 2. Furthermore, because the electrode for contactless electric power reception 65 is significantly lighter, the movable section can be even lighter. In addition, the electrode for contactless electric power reception 65 can easily be manufactured such as by a press forming method, and it is possible to remarkably reduce manufacturing costs.

It is acceptable for electrode for contactless electric power supply 41 of the fixed section 2 side for embodiment 1 to be formed from a single metal, and conversely, it is also acceptable for electrode for contactless electric power supply 43 of embodiment 2 and 3 to be formed with a conducting layer and core body. In addition, it is acceptable for the cross section shape of the tooth section of the electrode to take a trapezoid shape or other shape not shown in the embodiments so long as the opposing surface area can be increased. Various other applications and modifications are possible for the present invention.

INDUSTRIAL APPLICABILITY

The electrostatic coupling type contactless electric power supply device according to the invention can be used in board manufacturing equipment including component mounters, further, it can also be used in a wide field of industrial working apparatuses for other industries which have movable sections and require contactless electric power supply.

REFERENCE SIGNS LIST

1: Electrostatic coupling type contactless electric power supply device
2: Fixed section
3: Movable section
41, 42, 43: Electrode for contactless electric power supply
411, 431: Base section
412, 432: Tooth section
413: Conducting layer
414: Core body
47, 48: Flat electrode for electric power supply
5: High-frequency power source circuit
61, 62, 63, 64, 65: Electrode for contactless electric power reception
611, 631, 641, 651: Base section
612, 632, 642, 652: Tooth section
613, 633, 643: Conducting layer
614, 634, 644: Core body
645, 655: Space
67, 68: Flat electrode for receiving electric power
7: Electric power reception circuit
9: Conventional electrostatic coupling type contactless electric power supply device
10: Component mounter
110: Board conveyance device
120: Component supply device
130, 140: Component transfer device
150: Linear motor device
160: Movable main body section
161: X-axis rail
170: Mounting head
180: Display settings device
190: Base
L: Current consumer
d: Clearance

The invention claimed is:

1. An electrostatic coupling type contactless electric power supply device comprising:
   multiple electrodes for contactless electric power supply provided on a fixed section,
   a high-frequency power source circuit which supplies high-frequency electric power between the multiple electrodes for contactless electric power supply,
   multiple electrodes for contactless electric power reception for receiving high-frequency electric power in a contactless manner which are respectively facing and separated from the multiple electrodes for contactless electric power supply and which are provided on a movable section movably mounted on the fixed section, and
   an electric power reception circuit which supplies electric power to a current consumer on the movable section after converting the high-frequency power which the multiple electrodes for contactless electric power reception received, wherein
   the electrodes for contactless electric power supply and the electrodes for contactless electric power reception each have a cross section shape perpendicular to the moving direction of the movable section made from a base section and multiple tooth sections extending from the base section, and are interdigitated array electrodes in which the multiple fellow tooth sections are mutually alternating and separated while fitting together, and
   each of the electrodes for contactless electric power reception is an interdigitated array electrode in which an outer surface of the tooth sections and an outer surface of the base section is continuously covered with a conducting layer and an internal section of the tooth sections and the base section are formed from material that has a smaller specific gravity than the conducting layer.

2. An electrostatic coupling type contactless electric power supply device with respect to claim 1, wherein each of the electrodes for contactless electric power supply is an interdigitated array electrode in which an outer surface of the tooth sections and an outer surface of the base section is continuously covered with a conducting layer and an internal section of the tooth sections and the base section are formed from material that has a smaller specific gravity than the conducting layer.

3. An electrostatic coupling type contactless electric power supply device with respect to claim 1, in which the cross sectional shape of the tooth sections of the interdigitated array electrodes is wider near the base section side and gets narrower the further away from the base section to form a triangular cross section or trapezoidal cross section.

4. An electrostatic coupling type contactless electric power supply device with respect to claim 1, in which the movable section is equipped in board manufacturing equipment for performing prescribed work on a board.

5. An electrostatic coupling type contactless electric power supply device with respect to claim 1, wherein
each of the electrodes for contactless electric power supply is an interdigitated array electrode made lighter by at least one of the tooth sections and the base section having a space inside.

6. An electrostatic coupling type contactless electric power supply device comprising:
multiple electrodes for contactless electric power supply provided on a fixed section,
a high-frequency power source circuit which supplies high-frequency electric power between the multiple electrodes for contactless electric power supply,
multiple electrodes for contactless electric power reception for receiving high-frequency electric power in a contactless manner which are respectively facing and separated from the multiple electrodes for contactless electric power supply and which are provided on a movable section movably mounted on the fixed section,
an electric power reception circuit which supplies electric power to a current consumer on the movable section after converting the high-frequency power which the multiple electrodes for contactless electric power reception received, wherein
the electrodes for contactless electric power supply and the electrodes for contactless electric power reception each have a cross section shape perpendicular to the moving direction of the movable section made from a base section and multiple tooth sections extending from the base section, and are interdigitated array electrodes in which the multiple fellow tooth sections are mutually alternating and separated while fitting together, and
each of the electrodes for contactless electric power reception is an interdigitated array electrode in which an outer surface of the tooth sections and an outer surface of the base section is continuously covered with a conducting layer and which is made lighter by at least one of the tooth sections and the base section having a space inside.

* * * * *